June 14, 1932.　　P. R. HOOPES　　1,862,538
TRIMMING MACHINE
Filed Feb. 12, 1930　　7 Sheets-Sheet 1

INVENTOR

June 14, 1932.   P. R. HOOPES   1,862,538
TRIMMING MACHINE
Filed Feb. 12, 1930   7 Sheets-Sheet 3

INVENTOR
Penrose R. Hoopes
BY
Emery, Booth, Varney & Whittemore
ATTORNEY

June 14, 1932.  P. R. HOOPES  1,862,538
TRIMMING MACHINE
Filed Feb. 12, 1930  7 Sheets-Sheet 4

INVENTOR
Penrose R. Hoopes
BY
Emery, Booth, Varney & Whittemore
ATTORNEY

Fig.5.

June 14, 1932.　　　P. R. HOOPES　　　1,862,538
TRIMMING MACHINE
Filed Feb. 12, 1930　　　7 Sheets-Sheet 6

INVENTOR
Penrose R. Hoopes
BY
Emery, Booth, Varney & Whittemore
ATTORNEY

June 14, 1932.　　P. R. HOOPES　　1,862,538
TRIMMING MACHINE
Filed Feb. 12, 1930　　7 Sheets-Sheet 7

INVENTOR
Penrose R. Hoopes
BY
Emery, Booth, Varney & Whittemore
ATTORNEY

Patented June 14, 1932

1,862,538

UNITED STATES PATENT OFFICE

PENROSE R. HOOPES, OF HARTFORD, CONNECTICUT

TRIMMING MACHINE

Application filed February 12, 1930. Serial No. 427,763.

This invention relates to trimming machines and pertains more particularly to machines for trimming the overflow from moulded rubber articles such as rubber heels, for example.

It is an object of the invention to provide a machine which will trim such articles rapidly and accurately and without damage to the article.

Other objects and advantages of the invention will appear hereinafter.

Figure 1:
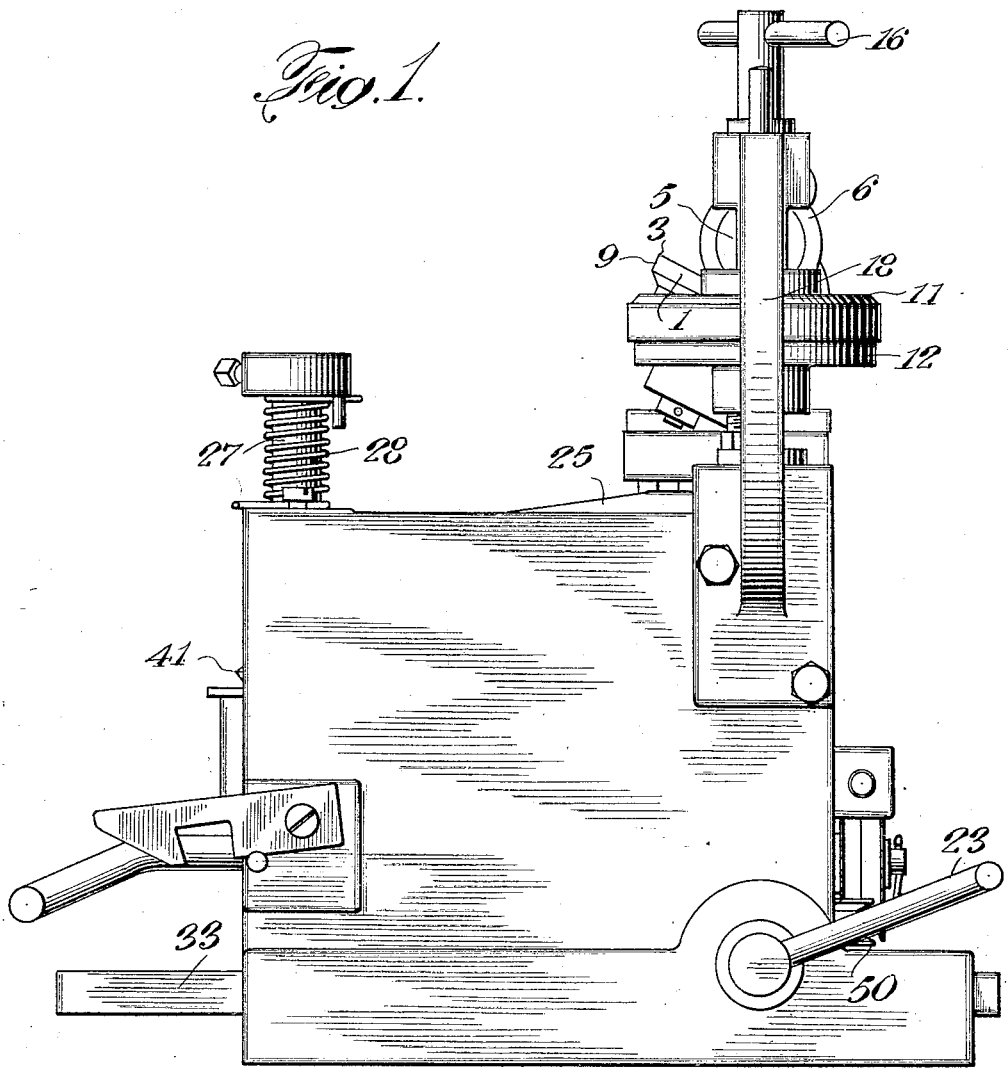
Figure 2:
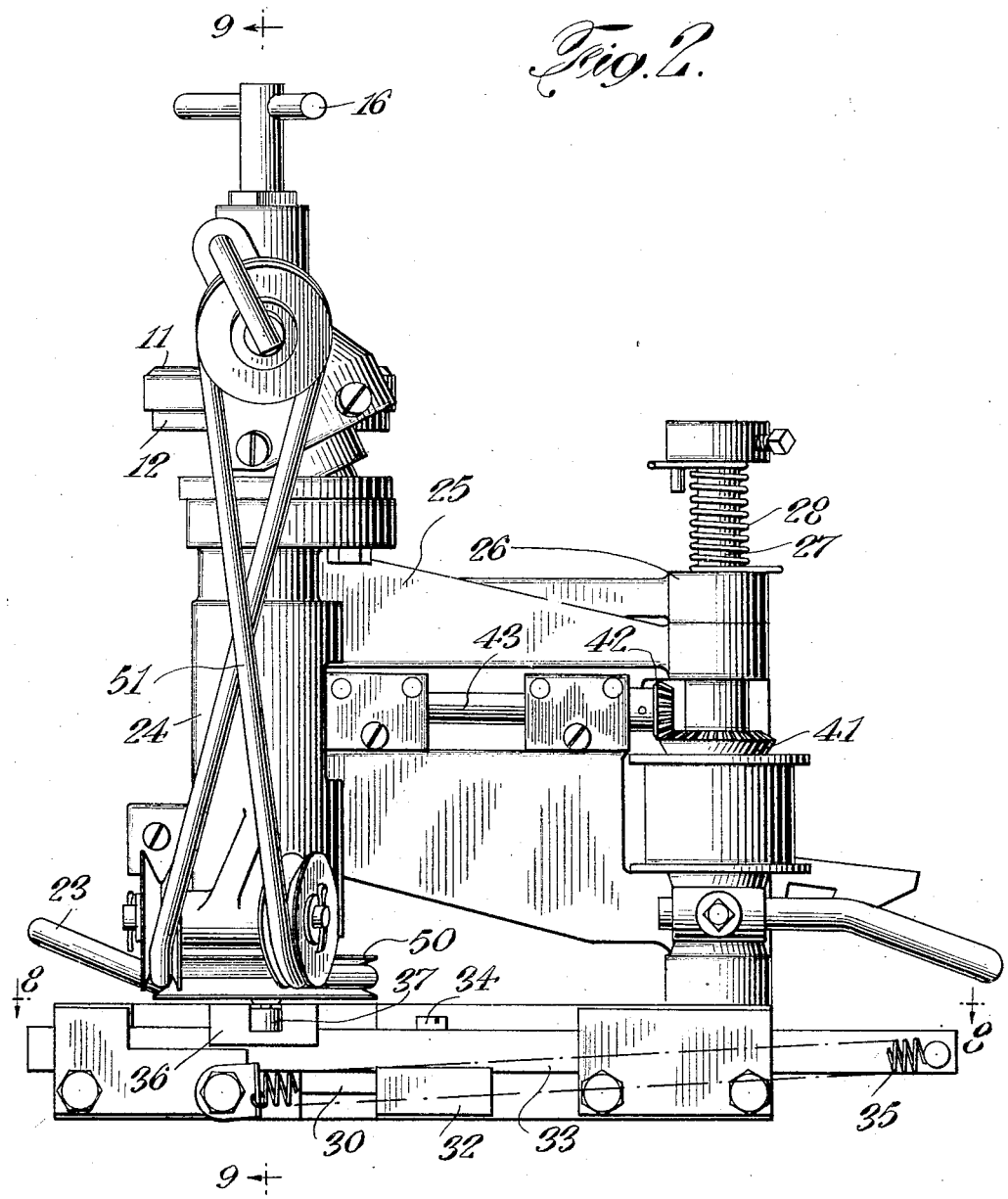
Figure 3:
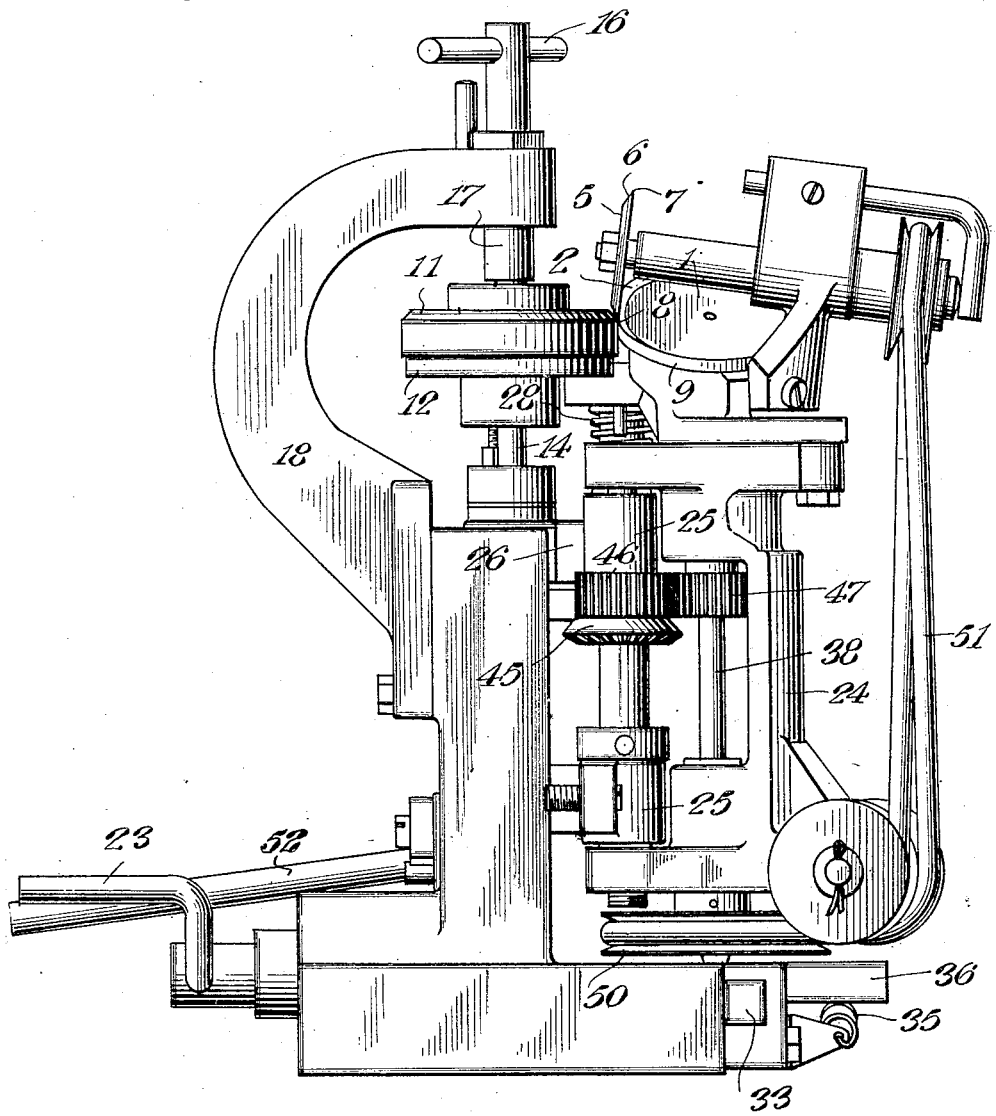
Figure 4:
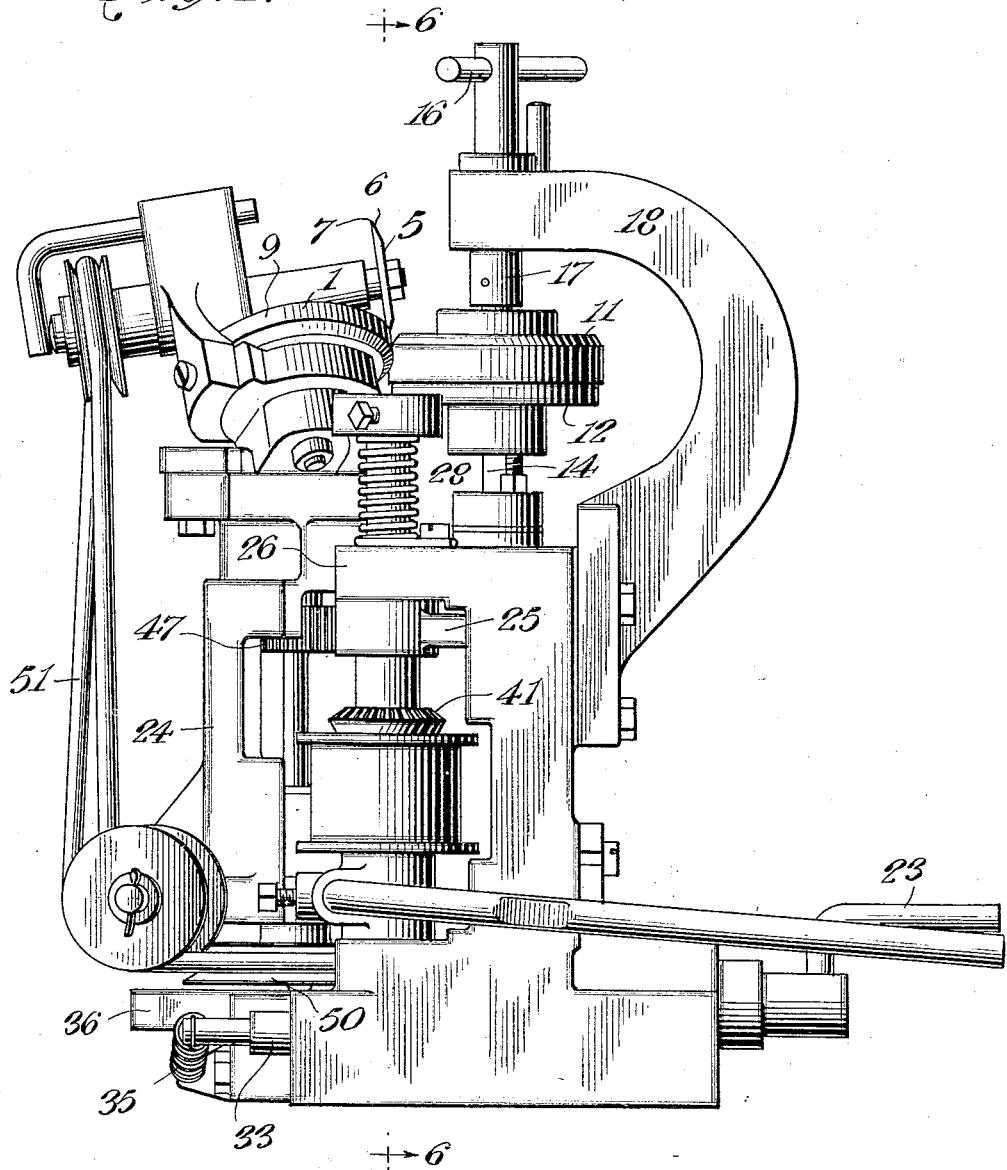
Figure 5:
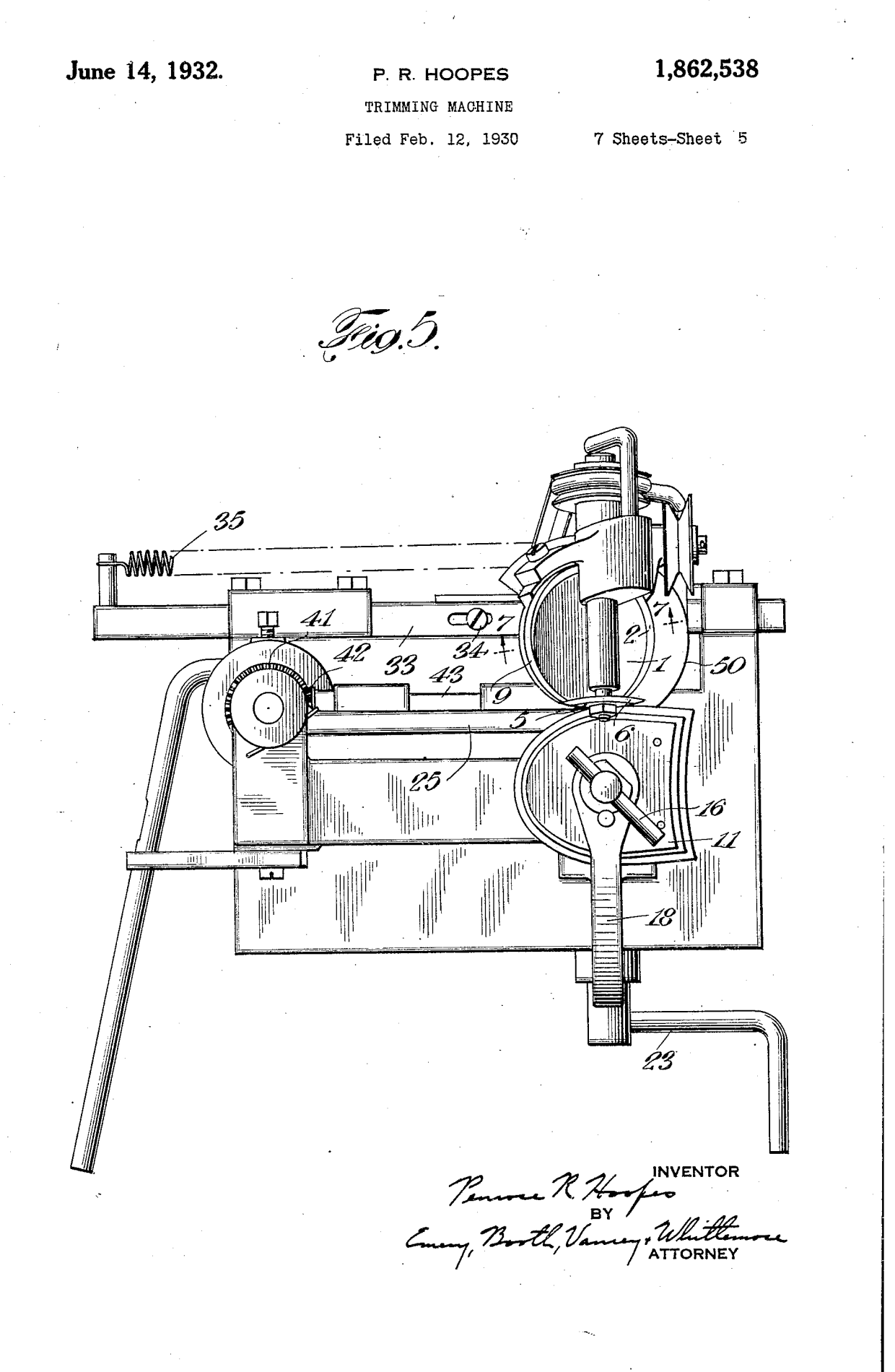
Figures 6, 7:
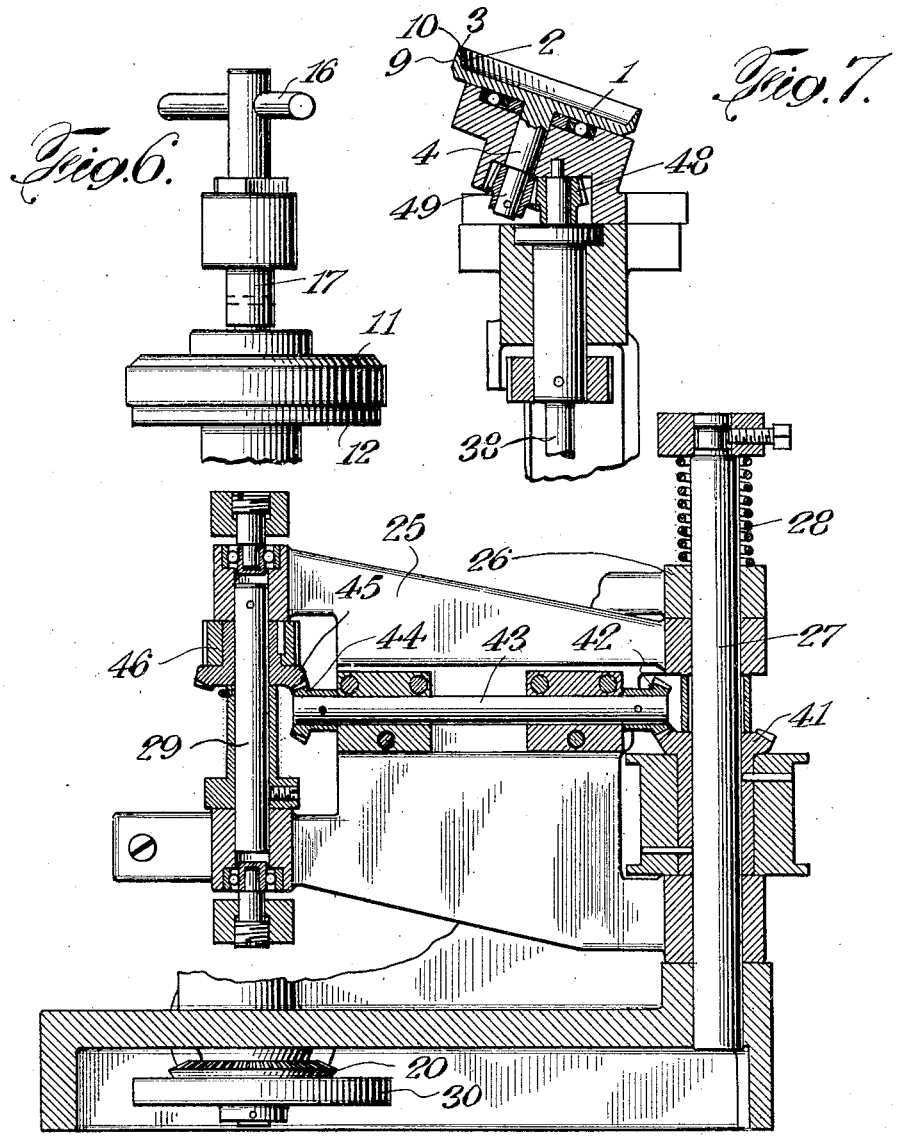
Figure 8:
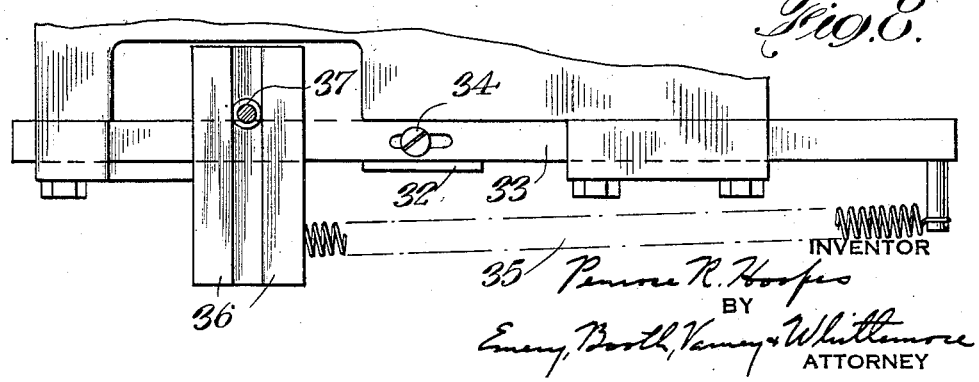
Figure 9:
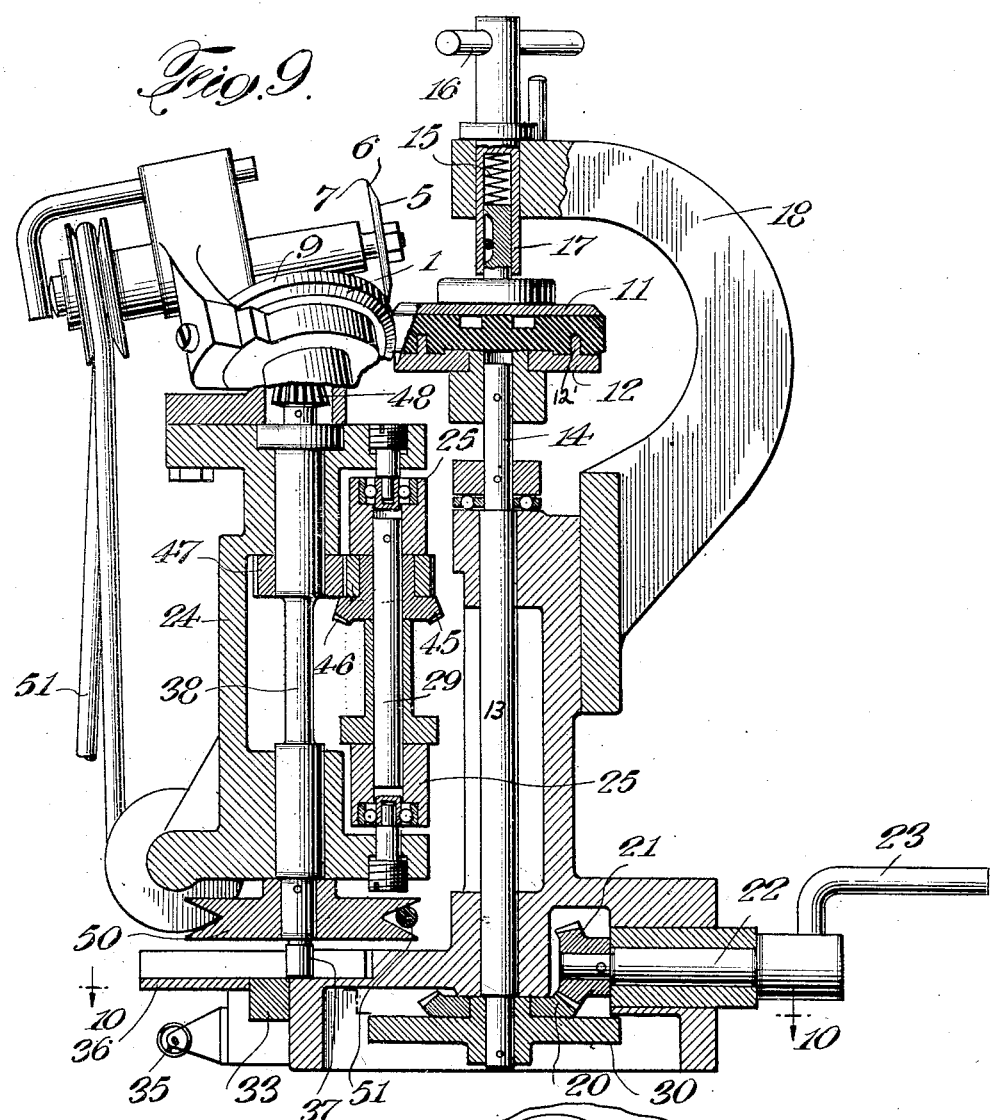
Figure 10:
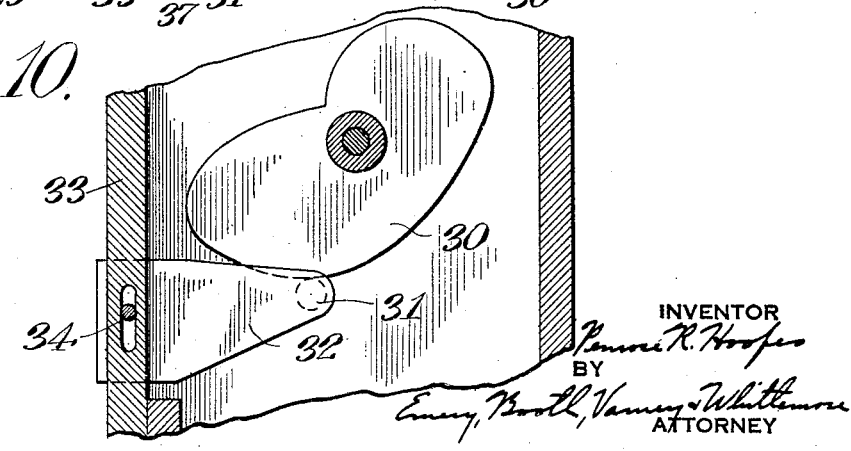

A preferred embodiment of the invention selected for purposes of illustration is shown in the accompanying drawings, in which, Figure 1 is a front elevation.
Figure 2 is a rear elevation.
Figures 3 and 4 are end elevations.
Figure 5 is a top plan view.
Figure 6 is a section on the line 6—6 of Figure 4.
Figure 7 is a section on the line 7—7 of Figure 5.
Figure 8 is a section on the line 8—8 of Figure 2.
Figure 9 is a section on the line 9—9 of Figure 2.
Figure 10 is a section on the line 10—10 of Figure 9.

For purposes of illustration herein, a cutting instrumentality is disclosed which is similar to that disclosed in a previous application of Penrose R. Hoopes, Serial No. 90,724, filed February 26, 1926, and entitled Trimming machines, but it will be understood that although the said cutting instrumentality is adapted for use in machines of the type described and claimed herein, this invention is not limited to the use of cutting instrumentalities of this specific type.

As described in the said Hoopes application, the cutting instrumentality comprises a cup 1 which is cut away to provide a surface 2 terminating in a cutting edge 3. The said cup is mounted for rotation about an axis 4 located at the center of the cup. Cooperating with the cup is a cutting disk 5 having a bevelled surface 6 providing a cutting edge 7 at the outer periphery of the disk. The surfaces 2 and 6 are formed in such manner that when the cup and disk are rotated in the directions indicated, the cutting edges form a single point of shear designated by the numeral 8.

If desired, the surface 2 may be made slightly concave and the surface 6 may be slightly convex so that the two may contact over a substantial area to thereby minimize wear. The outside of the cup is provided with a circular and slightly conical surface 9 against which the heel may contact during the trimming operation and which serves as a guide as the heel is being turned to expose various sides of the heel to trimming action. Lying between the cutting edge 3 and the surface 9 is a narrow land or flat annular surface 10 which serves to prevent the heel from contacting directly with the shearing point thus preventing injury to the heel itself during the trimming operation. The resiliency of the rubber is such that a complete cut is obtained, and the flow is removed sufficiently close to the heel that a substantially straight edge results. The cutting disk 5 is mounted for rotation on an axis which is preferably at right angles to the axis of rotation 4 of the cup 1, all as explained more in detail in said Hoopes application.

In the preferred embodiment illustrated, the axis 4 of the cup is inclined with respect to the plane of the article, in order that in trimming the overflow from moulded rubber articles such as heels, for example, the overflow may be conveniently fed to the point of shear. As will be understood, the overflow to be trimmed is irregular in shape and thickness and may assume a variety of positions as fed to the cutting point. By inclining the axis of the cup the edges of the cup and disk form moving guides which straighten out the irregular overflow and direct it properly toward the cutting point.

In the preferred embodiment illustrated, a work supporting means is provided which preferably gives to the work a predetermined movement, for example, a rotary movement about a given point in the work. Thus, in the present embodiment, wherein a machine is described in connection with trimming rubber heels, the work support includes a pair of spaced chucks 11 and 12 adapted to grasp the heel, and the said chucks are mounted for rotation on the axis 13. As will be observed in Figure 9, the chuck 12 is rigidly mounted on the shaft 14 and the chuck 11 is held in spring-pressed relationship therewith by means of the coil spring 15. When it is desired to release the chucks to remove or replace the heel, the handle 16 may be turned to release the pressure of spring 15, the sleeve 17 being slidably mounted in the bracket 18. For convenience in rotating the work, the shaft 14 is provided with a bevelled gear 20 which meshes with the bevelled gear 21 secured to the shaft 22 on which is mounted a crank 23.

The chuck 12 is provided with pins 12' which are located to engage the usual nail holes of the heels. In this manner the heel is positively located with respect to the cutter oscillating cam (hereinafter described) and also is positively rotated and held against displacement by the pressure of the cup 1.

In accordance with the present invention where it is desired to trim objects of irregular contour, it is desirable that the cutting instrumentality and the work support be mounted for relative movement with respect to one another and in the preferred embodiment illustrated, the cutting instrumentality is so mounted as to be movable toward and away from the center of rotation of the work, the axis 4 being fixed, but as will be understood, this arrangement may be reversed. Thus the cutting instrumentality comprising the cup 1 and the disk 5 are mounted on a bracket 24, which in turn is pivotally mounted on a bracket 25, which in turn is pivotally mounted on fixed support 26 which may be secured to or formed integrally with the base of the machine. As a result, it will be observed, the cutting instrumentality is movable toward and away from the axis of rotation of the work about the axis of shaft 27, and as will be understood, is normally urged into yielding contact with the work by means of the coil spring 28.

In the embodiment illustrated the bracket 24 is mounted to turn about the shaft 29 as an axis, said axis being perpendicular to the plane of rotation of the work. The said axis may be located wherever convenient to secure the desired amplitude of oscillation of the cutting instrumentality as hereinafter explained. According to the present invention, means are also provided for oscillating the bracket 24 and the cutting instrumentality about the said axis and for so controlling this oscillation that the point of shear is maintained in the line of the edge to be trimmed.

In view of the fact that the oscillation of the cutting instrumentality is related to the rotation of the work, the said oscillation may be conveniently controlled through the shaft 14, and for this purpose, a cam 30 may be mounted on said shaft, the shape of the said cam being developed with reference to the shape of the particular article to be trimmed, in order to provide the proper oscillation. As will be understood, different shaped articles require differently shaped cams, but the cam illustrated may be readily removed and replaced when desired by one of a different shape.

For cooperation with the said cam a roller 31 is provided mounted on a bracket 32 connected to slide 33 by means of set screw 34. The said roller is held in yielding contact with said cam by means of the spring 35, having one end attached to the slide 33 and the other end attached to a fixed point such as the base of the machine. The said slide has connected thereto a pair of spaced guides 36 between which is located a roller 37 carried on the extreme lower end of shaft 38. Thus as the cam 30 is rotated during the rotation of the work, the bracket 24 and the cutting instrumentality will be oscillated about the axis 29, and if the cam 30 is properly developed with relation to the article to be trimmed, the point of shear will be maintained at all times in the line of the edge to be trimmed.

In order to provide a suitable drive for the cutting members, a pulley 40 is mounted on the shaft 27, and bevelled gear 41 meshing with bevelled gear 42 drives shaft 43, which in turn drives shaft 29 through bevelled gears 44 and 45. Pinion 46 in turn, meshing with pinion 47, drives shaft 38, and meshing bevelled gears 48 and 49 drive the cup 1. Carried on the lower end of shaft 38 is a pulley 50 over which runs a belt 51 which drives the cutting disk 5. Thus the cup and disk are caused to rotate together at any desired relative speeds which the character of the material may require.

If desired, the handle 52 may be provided to swing the cutting instrumentality away from the work when it is desired to remove or insert the work.

It will be understood that the invention may be variously modified and embodied within the scope of the subjoined claims.

I claim as my invention:

1. In a trimming machine, a rotatable work supporting instrumentality, a cutting instrumentality having a single point of shear, means for supporting said cutting instrumentality for pivotal movement about two separate axes, and means for bodily moving said cutting instrumentality to maintain said point of shear at the edge of the work piece on said work supporting instrumentality.

2. In a machine for trimming the surface of a piece of work, a work holding instrumentality, a cutting instrumentality having a cutting point and a curved surface adapted to bear against the work surface to be trimmed, means for moving said surfaces into tangential engagement, and means for shifting said cutting instrumentality during operation of the machine to maintain said surfaces tangent and said cutting point at the point of tangency.

3. In a trimming machine, a work supporting instrumentality, a pivotally supported cutting instrumentality having a single cutting point, means for supporting said cutting instrumentality in such manner as to permit said cutting instrumentality to move toward and away from said work, and means for moving said cutting instrumentality about its pivotal support to maintain said cutting point in the line of the edge of the work as said work is rotated.

4. In a trimming machine, a work supporting instrumentality, a cutting instrumentality, said cutting instrumentality being mounted for turning movement about an axis, and said axis being mounted for turning movement about a second axis, whereby said cutting instrumentality may move about one axis or the other, or about both axes simultaneously, yielding means for urging said cutting instrumentality in the direction of the work about said second axis, and means for turning said cutting instrumentality about the other axis.

5. In a trimming machine, a work supporting instrumentality, means for rotating said work, a cutting instrumentality having a circular surface against which the work to be trimmed may bear, and means for shifting said cutting instrumentality to maintain the cutting point substantially at the point of tangency between said circular surface and the work.

6. In a trimming machine, a work supporting instrumentality, means for rotating said work, a cutting instrumentality having a circular surface against which the work to be trimmed may bear, said instrumentalities being mounted for relative movement toward and away from each other, yielding means for holding said circular surface against the work to be trimmed, and means for shifting said cutting instrumentality to maintain the cutting point substantially at the point of tangency between said circular surface and the work.

7. In a trimming machine, a work supporting instrumentality, means for rotating said work supporting instrumentality, a cutting instrumentality having a circular surface against which the work to be trimmed may bear, said cutting instrumentality being mounted for turning movement about an axis and said axis being mounted for turning movement about a second axis, whereby said cutting instrumentality may move about one axis or the other or about both axes simultaneously, yielding means for holding the work in contact with said circular surface, and cam controlled means for turning said cutting instrumentality about said first named axis.

8. In a trimming machine for curved work, a work supporting instrumentality, a cutting instrumentality having a cutting point and means to engage the edge of the work to be trimmed to guide said cutting instrumentality, said instrumentalities being mounted for relative movement one toward the other, means normally urging said instrumentalities toward one another, and cam controlled means for shifting said cutting instrumentality in such manner that said cutting point is maintained at the point of tangency between the work and said cutting instrumentality.

9. In a machine for trimming overflow from molded rubber articles, a cutting instrumentality comprising two cooperating rotating members having a single cutting point, the axis of one of said rotating members being inclined with respect to the plane of rotation of the work, whereby the two rotating members serve as moving guides to direct the overflow to the cutting point.

In testimony whereof, I have signed my name to this specification this 7th day of February 1930.

PENROSE R. HOOPES.